(12) United States Patent
Cowan

(10) Patent No.: US 7,848,260 B2
(45) Date of Patent: Dec. 7, 2010

(54) SYSTEM AND METHOD OF UNSTRUCTURED ANALYSIS THROUGH THE APPLICATION OF MULTIPLE STRUCTURE MAPS

(75) Inventor: Charles R. Cowan, Alexandria, VA (US)

(73) Assignee: International Business Machines Corporation, Armonk, NY (US)

( * ) Notice: Subject to any disclaimer, the term of this patent is extended or adjusted under 35 U.S.C. 154(b) by 1420 days.

(21) Appl. No.: 11/283,398

(22) Filed: Nov. 17, 2005

(65) Prior Publication Data

US 2007/0124281 A1    May 31, 2007

(51) Int. Cl.
*H04L 12/28* (2006.01)
(52) U.S. Cl. .................. 370/255; 370/229; 370/252; 370/256
(58) Field of Classification Search .................. None
See application file for complete search history.

(56) References Cited

U.S. PATENT DOCUMENTS

| 5,627,979 | A | 5/1997 | Chang et al. |
| 6,901,409 | B2 | 5/2005 | Dessloch et al. |
| 7,463,648 | B1 * | 12/2008 | Eppstein et al. ............. 370/468 |
| 2005/0111386 | A1 * | 5/2005 | Jain et al. ................... 370/256 |

FOREIGN PATENT DOCUMENTS

WO    WO 02/46916 A2    6/2002

* cited by examiner

*Primary Examiner*—Duc C Ho
(74) *Attorney, Agent, or Firm*—Dillon & Yudell LLP

(57) ABSTRACT

A system and method of unstructured information analysis through the application of multiple structure maps. A preferred embodiment of the present invention includes providing a mapping framework implemented as a coupled collection of nodes, attaching the information elements to the collection of nodes, coupling the information elements with at least one two-way hard relationship line, and providing a viewer to present the information elements visually with at least one logical structure.

23 Claims, 15 Drawing Sheets

| | JOE | JOHN | PETER | ... |
|---|---|---|---|---|
| VISUAL ID AT SCENE | 10/25/2002 | 10/26/2002 | 10/27/2002 | ... |
| CLOTHING | T-SHIRT, BLUE JEANS | SUIT & TIE | JOGGING SWEATS | ... |
| HOME ADDRESS | 101 ROSE STREET | 642 ELM STREET | 436 MAIN STREET | ... |
| ... | ... | ... | ... | ... |

SYSTEM AND METHOD OF UNSTRUCTURED ANALYSIS THROUGH THE APPLICATION OF MULTIPLE STRUCTURE MAPS

BACKGROUND OF THE INVENTION

1. Technical Field

The present invention relates in general to the field of data processing systems. More particularly, the present invention relates to the field of analyzing data utilizing data processing systems. Still more particularly, the present invention relates to a system and method of analyzing data utilizing data processing systems through the application of multiple structure maps.

2. Description of the Related Art

Many professions require the collection, organization, and analysis of information and ideas in order to draw conclusions and generate new ideas and concepts. These professions include academic and scientific research, legal, criminal case investigation, business, journalism, intelligence analysis, and other professions that required the examination and analysis of various sources of information. The information utilized by these professions may take many different forms, including, but not limited to, text, rich text, images, numbers, dates and times, geographic locations, media files, etc.

The analysis of information to extract conclusions and the synthesis of new ideas generally involves organizing, sorting, categorizing, and connecting the elements of information until patters emerge and concepts are formulated. Often, the appropriate structure for organizing the information to expose patterns and ideas is not readily apparent until analysis begins. The model utilized by the researcher to organize the information is likely to change during the course of the analysis. For example, a criminal investigator may wish to look at information about a crime organized around people, geography, or time. The criminal investigator can gain more insight about the crime by placing two people in the same place at the same time.

The types of models utilized by researches vary widely and include approaches such as hierarchical categories, genealogical inheritance, timelines, two-dimensional geographic maps, matrices, and checklists. Fortunately, many different models can be constructed on a fairly small set of inherent data structures. For example, a tree structure provides a base for any of the hierarchical types of categorization, genealogy, and checklists. A network structure can provide a base for geographic analysis or for a model of the relationships between groups or organizations. A grid structure can be utilized to connect two concepts such as time and place. A linear structure can map time or the structure of a printed document, including headings and paragraphs.

Often, a researcher does not know which data structure would be appropriate for his or her specific task. Time that is wasted in merely deciding how to organize the collected information would be much better spent analyzing the information. Therefore, there is a need for a system and method for organizing and analyzing information utilizing a data processing system that enables a researcher to quickly reorganize collected information in multiple structure maps.

SUMMARY OF THE INVENTION

The present invention includes a system and method of unstructured information analysis through the application of multiple structure maps. A preferred embodiment of the present invention includes providing a mapping framework implemented as a coupled collection of nodes, attaching the information elements to the collection of nodes, coupling the information elements with at least one two-way hard relationship line, and providing a viewer to present the information elements visually with at least one logical structure.

The above-mentioned features, as well as additional objectives, features, and advantages of the present invention will become apparent in the following detailed description.

BRIEF DESCRIPTION OF THE FIGURES

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

Figure 1:
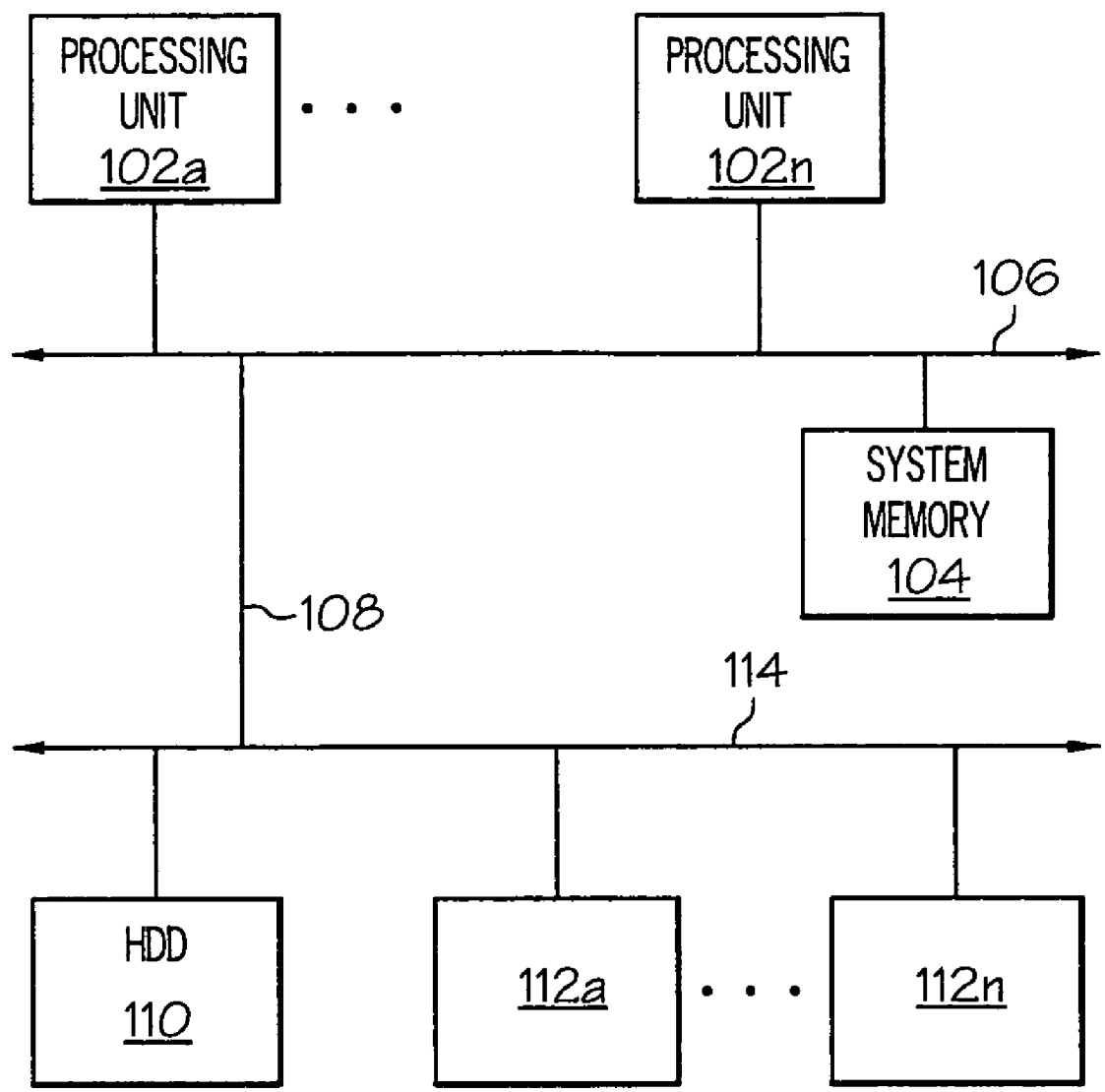
FIG. 1 illustrates a block diagram of an exemplary data processing system in which a preferred embodiment of the present invention may be implemented.

With reference now to the figures, and in particular to FIG. 1, there is depicted a block diagram of an exemplary data processing system in which a preferred embodiment of the present invention may be implemented. As depicted, exemplary data processing system 100 includes processing unit(s) 102a-n, which are coupled to system memory 104 via system bus 106. Preferably, system memory 104 may be implemented as a collection of dynamic random access memory (DRAM) modules. System memory 104 includes data and instructions for running a collection of applications. Mezzanine bus 108 acts as an intermediary between system bus 106 and peripheral bus 114. Those with skill in this art will appreciate that peripheral bus 114 may be implemented as a peripheral component interconnect (PCI), accelerated graphics port (AGP), or any other peripheral bus. Coupled to peripheral bus 114 is hard disk drive 110, which is utilized by data processing system 100 as a mass storage device. Also coupled to peripheral bus 114 is a collection of peripherals 112a-n.

Those skilled in the art will appreciate that data processing system 100 can include many additional components not specifically illustrated in FIG. 1. Because such additional components are not necessary for an understanding of the present invention, they are not illustrated in FIG. 1 or discussed further herein. It should also be understood, however, that the enhancements to data processing system 100 to improve handling of shared resources provided by the present invention are applicable to data processing systems of any system architecture and are in no way limited to the generalized multi-processor architecture or symmetric multi-processing (SMP) architecture illustrated in FIG. 1.

Figure 2:
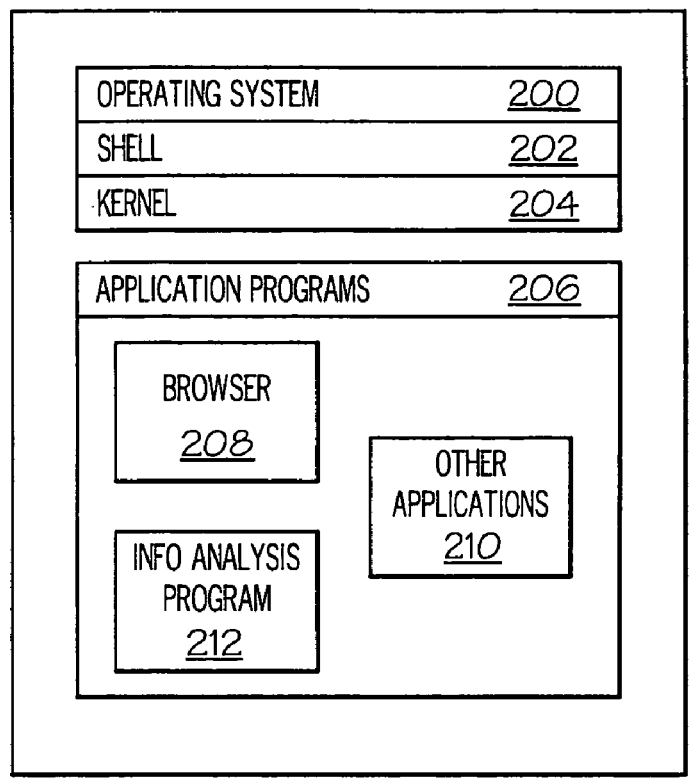
FIG. 2 depicts a block diagram of the exemplary contents of the system memory of the data processing system shown in FIG. 1.

With reference now to FIG. 2, there is depicted a block diagram of the contents of system memory 104 according to a preferred embodiment of the present invention. Operating system 200 includes a shell 202, for providing transparent user access to resources such as application programs 206. Generally, shell 202 is a program that provides an interpreter and an interface between the user and operating system. More specifically, shell 202 executes commands that are entered into a command line user interface or from a file. Thus, shell 202 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 204) for processing. Note that while shell 202 is a text-based, line-oriented user interface, the present invention will equally well support other user interface modes, such as graphical, voice, gestural, etc.

As depicted, operating system 200 also includes kernel 204, which includes lower levels of functionality for operating system 200, including providing essential services required by other parts of operating system 200 and application programs 206, including memory management, process and task management, disk management, and mouse and keyboard management.

Application programs 206 include a browser 208. Browser 208 includes program modules and instructions enabling World Wide Web (WWW) client (e.g., data processing system 100) to send and receive network messages to the Internet utilizing HyperText Transfer Protocol (HTTP) messaging. Browser 208 may also be utilized in conjunction with information analysis program 212, as discussed herein in more detail.

Application programs 206 in data processing system 100's system memory 104 also include other applications 210 (e.g., word processors, spreadsheets, databases, etc.), and information analysis program 212. Information analysis program 212 discussed herein in more detail in conjunction with FIGS. 3 and 4, enables a user to assemble a collection of information elements, couple at least two information elements with a two-way hard association link, and provide a viewer (e.g., browser 208) to present the information elements visually in at least one logical structure. Those with skill in the art will appreciate that the viewer may offer user-interactive features such as the ability to navigate and edit the presented view of the information elements.

Figure 3A:
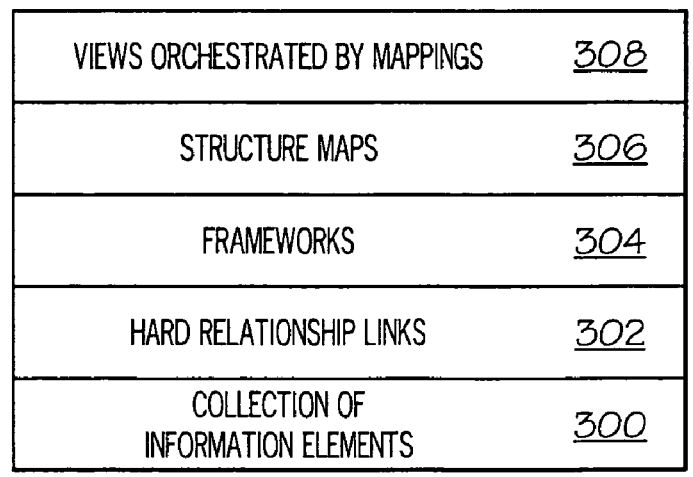
FIG. 3A illustrates a block diagram of the structure of the exemplary information analysis program show in FIG. 2.

FIG. 3A is a block diagram illustrating different levels of information analysis program 212 according to a preferred embodiment of the present invention. As depicted, information analysis program 212 includes five major levels: collection of information elements 300, hard relationship links 302, frameworks 304, structure maps 306, and views orchestrated by mappings 308. Generally, collection of information elements 300 is imported or entered directly into information analysis program 212 either by a user or some other type of importation method. The character of collection of information elements 300 depends on the type of analysis desired. For example, a detective who is investigating a bank robbery may include information elements such as portions of police files of possible subjects, photographs of the crime scene, any video from any available surveillance cameras in the area.

Frameworks 304 represent anchors organized into particular structural relationships for coupling collection of information elements 300. Frameworks 304, as discussed herein in more detail, may include, but are not limited to, linear structures, tree structures, network structures, or matrices.

Structure maps 306 are frameworks 304 with the collection of information elements 300 coupled to the nodes of the selected framework. Views orchestrated by mappings 308 represent the information in a particular structure map 306 organized into a format (e.g., spreadsheet, document, or hierarchical tree structure) easily readable by human users.

Figure 3B:
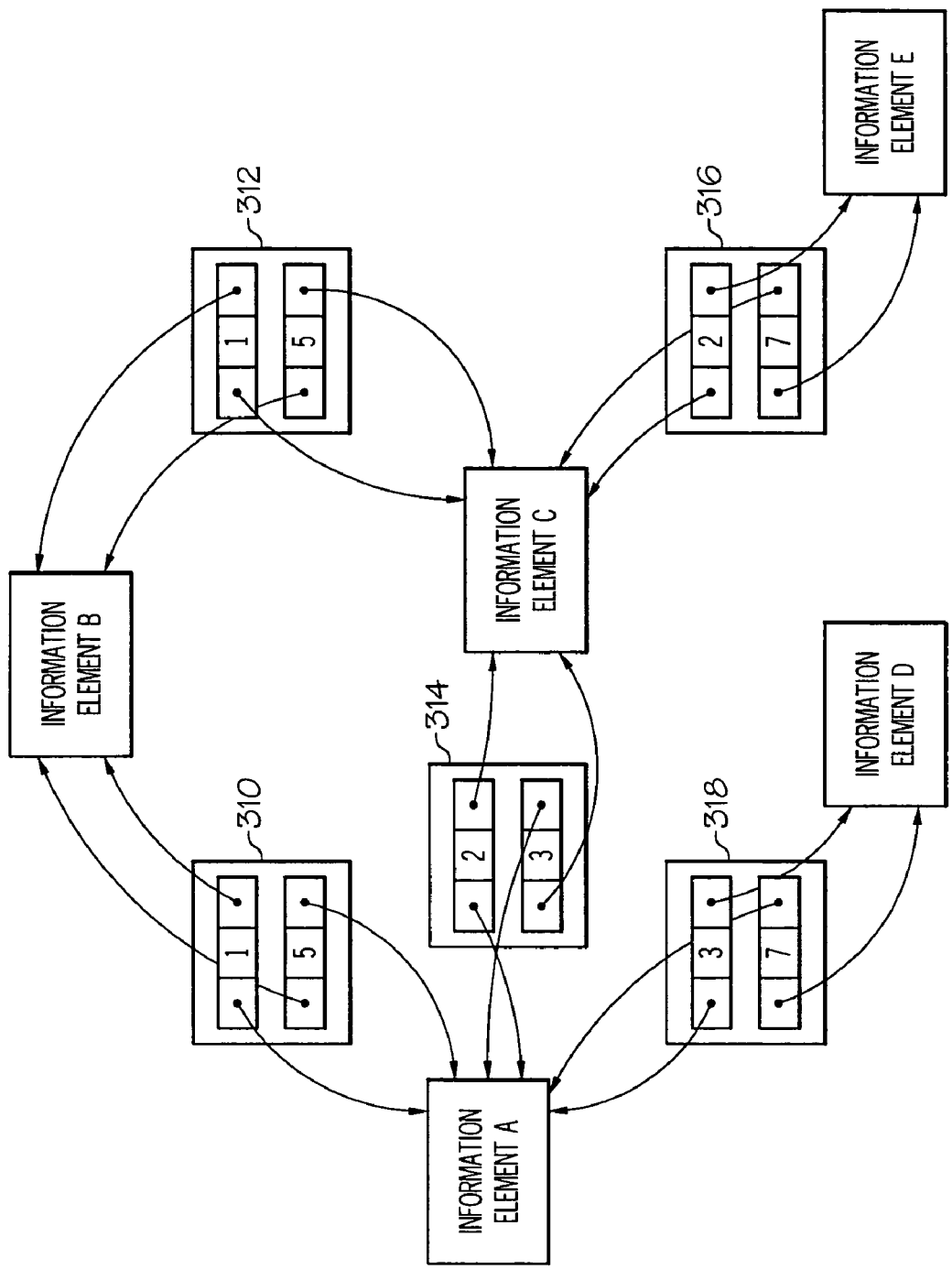
FIG. 3B depicts an exemplary two-way hard relationship links between a collection of information elements according to a preferred embodiment of the present invention.

FIG. 3B depicts hard relationship links 302 of collection of information elements 300 in more detail according to a preferred embodiment of the present invention. As illustrated, a hard relationship link includes two separate database links that are logically connected (via a common link ID). A link includes two pointers (that further include the ID of an information element), a "left pointer" and a "right pointer". Each link preferably has a pointer to two different information elements. If all of the hard links with a left pointer equal to the ID of a particular information element are selected, the right pointers represent all of the linked information elements. Each of the hard relationship links preferably includes a number that represents the order in which those links should be processed.

Still referring to FIG. 3B, information element (IE) A is coupled first to IE B (via link 310), and then to IE C (via link 314), and finally to IE D (via link 318). IE C is coupled to IE B (via link 312), IE E (via link 316), and then to IE A (via link 314). When a new information element is created or imported into information analysis program 212, the new information element is coupled to a framework or to another information element. When coupling the new information element to another existing information element, the order number can be utilized to add the new information element to the end of the set of coupled information elements or can be placed at any point in the chain of connections via updating the order number in the other links in the chain.

Another feature of the link, according to a preferred embodiment of the present invention, is an "attribute" or a tag to describe the significance of the link between the two information elements. The attribute can be represented as data stored in the link or, as shown in a preferred embodiment of the present invention, a pointer or ID of an information element.

Frameworks 304 enable a user to organize the collection of information elements. Attaching information elements to nodes on frameworks 304 add an additional level of organization above the two-way hard relationship links discussed in conjunction with FIG. 3B. Frameworks 304 include hierarchical trees (FIG. 3C), networks (FIG. 3D), time-lines (FIG. 3E) or any other organization scheme. A framework 304 with attached information elements is hereinafter referred to as "structure maps", as illustrated as structure maps 306 (FIG. 3A).

Figure 3C:
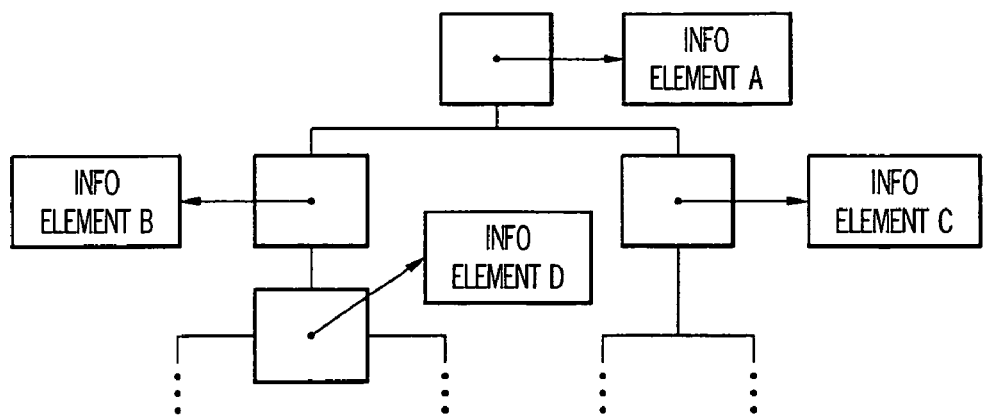
FIG. 3C illustrates an exemplary hierarchical tree structure utilized to organize a collection of information elements according to a preferred embodiment of the present invention.

For example, referring to FIGS. 3B and 3C (hierarchical tree framework), not only does IE A have a two-way hard relationship link with IE B, IE B has a child relationship with IE A and a peer relationship with IE C.

Figure 3D:
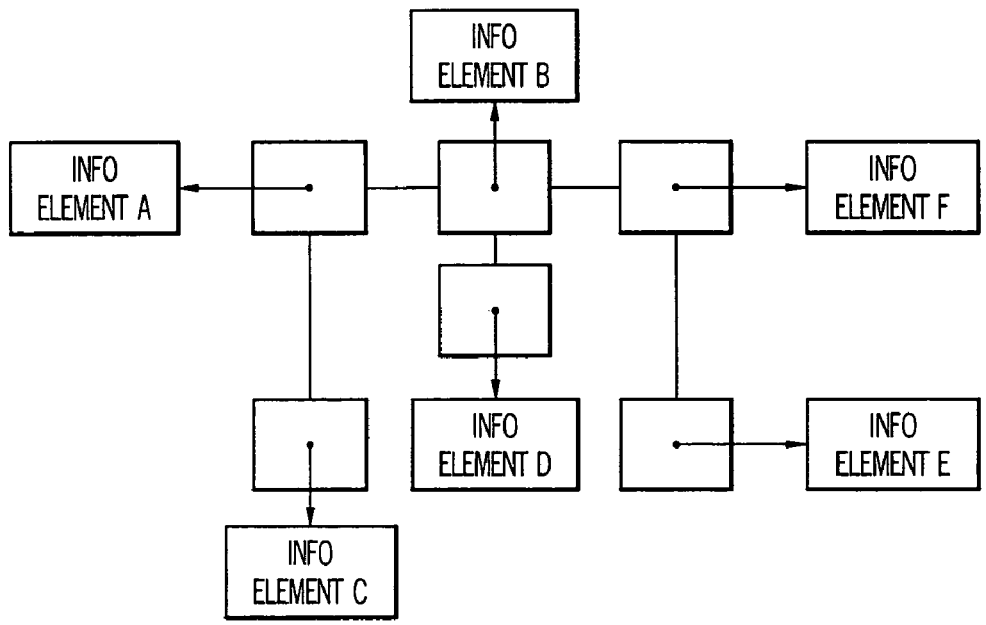
FIG. 3D depicts an exemplary network structure utilized to organize a collection of information elements according to a preferred embodiment of the present invention.

With reference to FIGS. 3B and 3D (network framework), information elements organized within a network framework could depict a geographic relationship between the elements. For example, IE A is geographically related to IE B and IE C, as illustrated in FIG. 3D. Those with skill in the art will appreciate that multiple frameworks/structure maps may be utilized by the user concurrently.

Figure 3E:
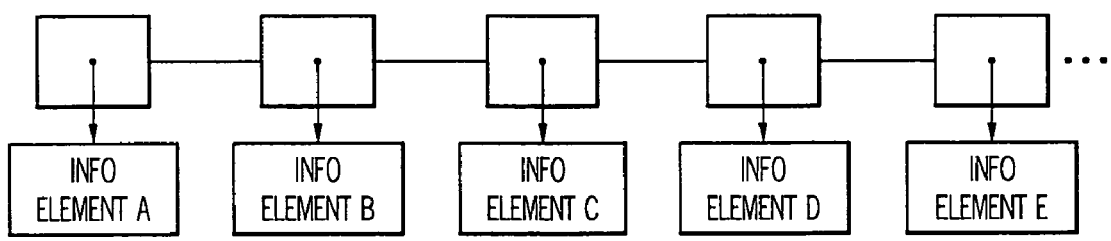
FIG. 3E illustrates an exemplary linear/time-line structure utilized to organize a collection of information elements according to a preferred embodiment of the present invention.

Referring now to FIGS. 3B and 3E (time-line framework), information organized with a time-line framework illustrates a temporal relationship between the information elements. For example, the events documented in IE A occurred before the events documented in IE B and IE C.

Figures 4A, 4B:
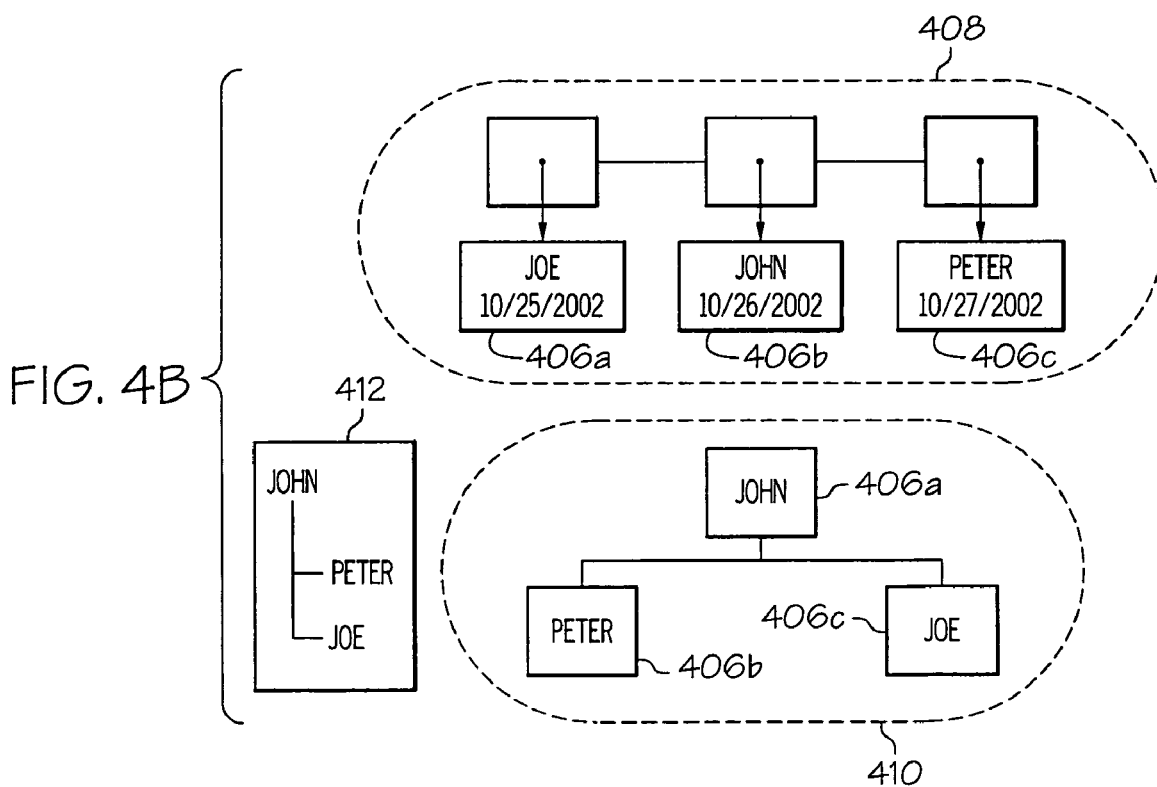
FIG. 4A depicts an exemplary table utilized to display a collection of information elements in a readable format according to a preferred embodiment of the present invention.
FIG. 4B illustrates an exemplary tree structure utilized to display a collection of information elements in a readable format according to a preferred embodiment of the present invention.

With reference now to FIGS. 4A-B, there is depicted a pair of exemplary views orchestrated by mappings as described in FIG. 3A. These views may be implemented by browser 208 and allow data processing system 100 to display the information organized in structure maps 306 into visual formats appropriate for human comprehension and analysis. Referring to FIG. 4A, assume that each information element 406*a-c* is a record of a suspect in a bank robbery. As depicted in time-line structure map 408, each information element 406*a-c* is organized in chronological order by the date in which each suspect was last seen at the scene of the crime. In order to enable an appropriate visual format, the user of information analysis program 212 may select a "table view" of the information elements, as shown in table 400. Table 400 displays the names of the suspects in columns 404 and information associated to the suspects in rows 402. As illustrated in row 402*a*, the records are displayed in chronological order, just as they are arranged in time-line structure map 404. Those with skill in the art will appreciate that a tree view can be combined with a table view. For example, a tree view similar to tree view 412 could be represented in a column of a table like table 400.

FIG. 4B illustrates an exemplary view tree structure display of records organized in a hierarchical tree structure. For example, if the user is aware that John is the father of Peter and Joe, the user may select a hierarchical tree framework to attach the records of John, Peter, and Joe to each node. The user can select the "tree structure display view" to display the relationship between the three suspects in a easily readable format.

Figure 5:
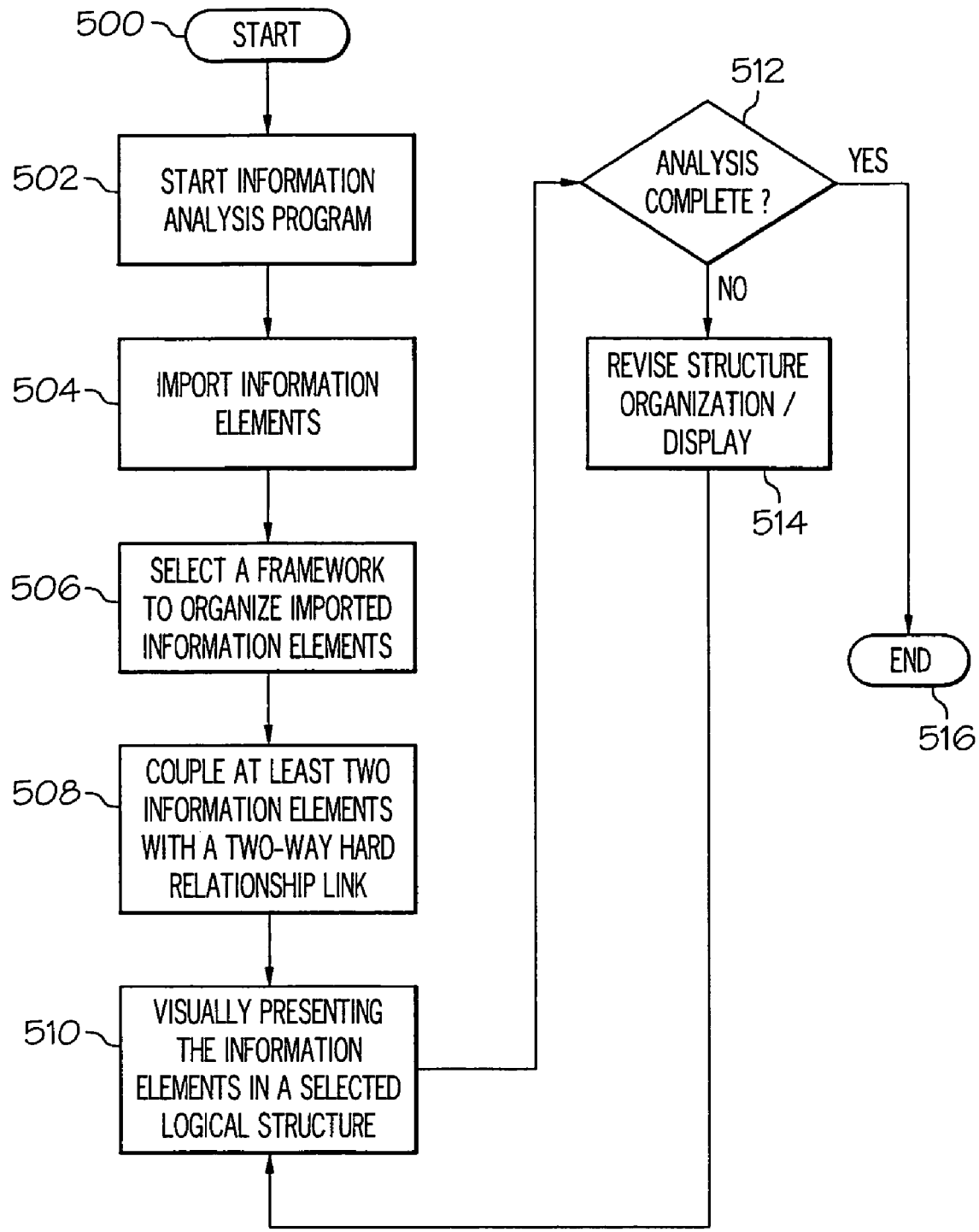
FIG. 5 is a high-level logical flowchart diagram of a method of unstructured analysis through the application of multiple structure maps according to a preferred embodiment of the present invention.

Referring to FIG. 5, there is a high-level logical flowchart diagram illustrating an exemplary method of unstructured information analysis through the application of multiple structure maps according to a preferred embodiment of the present invention.

The process begins at step 500 and proceeds to step 502, which illustrates the starting of information analysis program 212. Those with skill in the art will appreciate that information analysis program 212 may be started by a user, an automated process, or by any other method of starting a program within a data processing system. The process proceeds to step 504, which depicts the importation of information elements. The information elements, like information elements depicted in FIGS. 3B-3E, may be text files, images, video clips, sound files, or any other collection of information.

The process continues to step 506, which depicts a selection made (e.g., by a user) as to which framework is utilized to organize the imported information elements into a structure map (i.e., a framework 304 with information elements coupled to the nodes). For example, if the collected information elements are files regarding related family members, the user may decide to utilize the hierarchical tree framework (FIG. 3C) to organize the files in a family tree. If the collected elements are events occurring at specific times, the user may utilize the time-line framework (FIG. 3E) to order the information elements in chronological order.

Then, the process proceeds to step 508, which illustrates the user coupling at least two of the collected information elements with a two-way hard relationship link. For example, if the collected information elements are files regarding family members, the user may make a two-way hard relationship link between two family members who work in the same place of business or members who were born in the same city.

The process continues to step 510, which depicts information analysis program 212 visually presenting the information elements in a selected logical structure (FIGS. 4A-B). For example, once a user has organized the information elements into a time-line structure map 410, the user may select an option to display the information elements in a table, with the records in chronological order, like table 400. The user also has the option of displaying the information elements in other formats, such as a tree structure, text document, or spreadsheet format.

After the information elements are displayed in a selected logical structure, data processing system 100 queries the user to determine if the analysis of the information elements is complete (step 512). New relationships between the information elements are often discovered with the display of the logical structure. Typically, in response to the discovery of new relationships (e.g., the analysis is not complete), the user will revise or add two-way hard relationships between the information elements, change the currently-selected logical structure to another structure (e.g., linear structure to a tree structure to display any parent/child relationships between certain information elements) (step 514). The process returns to step 510 and continues in an iterative fashion. Returning to step 512, if the user determines that the analysis of the information elements is complete, the process ends, as illustrated in step 516.

Those with skill in the art will appreciate that a computer algorithm can be utilized to analyze one or more information items to automatically create hard relationship links and/or connections to a framework or structure map. For example, a computer algorithm could detect dates or names in an information item and couple the item to similar names and dates. The user could, if desired, be given the option to accept or reject such "automatic connections". Of course, those with skill in this art will appreciate that the computer algorithm includes any type of "automatic connection" and is in no way limited to the automatic connection of dates and names.

As disclosed, the present invention includes a system and method of unstructured information analysis through the application of multiple structure maps. A preferred embodiment of the present invention includes providing a mapping framework implemented as a coupled collection of nodes, attaching the information elements to the collection of nodes, coupling the information elements with at least one two-way hard relationship line, and providing a viewer to present the information elements visually with at least one logical structure.

Software Deployment

Thus, the method described herein, and in particular as shown and described in FIG. 5, can be deployed as a process software from a service provider server to client computer, such as data processing system 100.

Figure 6A:
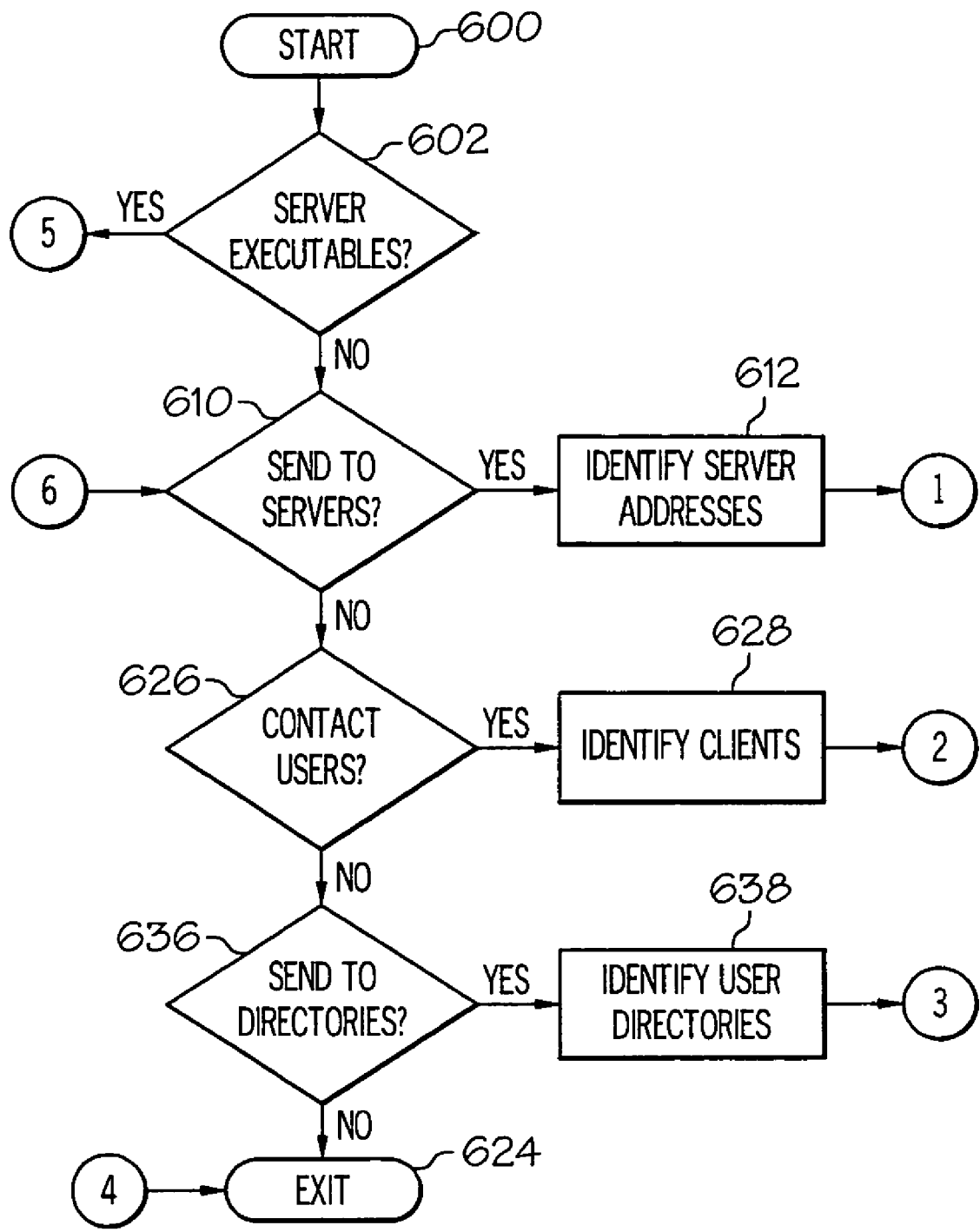
FIGS. 6A-B show a flowchart of steps taken to deploy software capable of executing the steps show and described in FIG. 5.
Figure 6B:
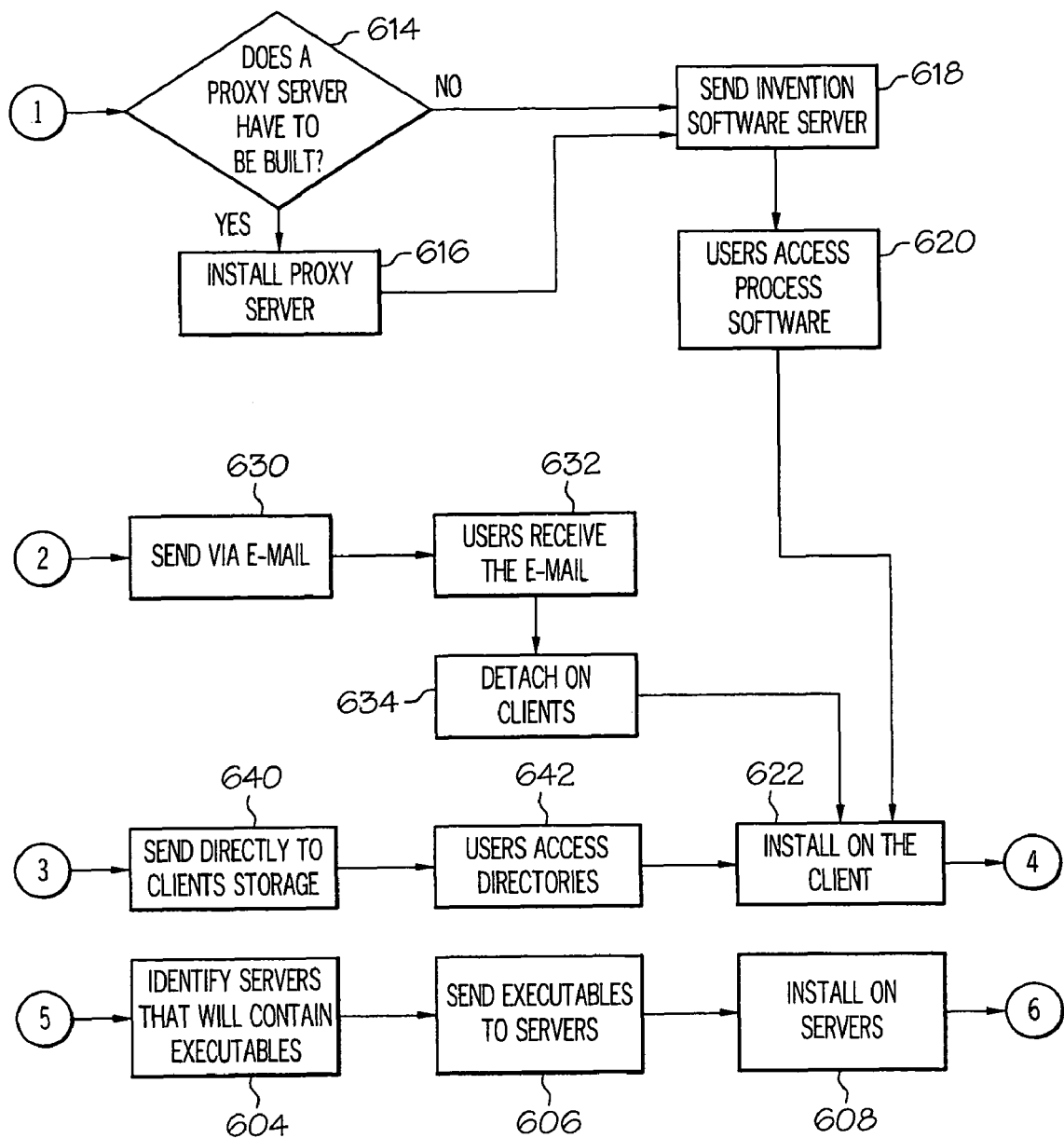

Referring then to FIG. 6, step 600 begins the deployment of the process software. The first thing is to determine if there are any programs that will reside on a server or servers when the process software is executed (query block 602). If this is the case, then the servers that will contain the executables are identified (block 604). The process software for the server or servers is transferred directly to the servers' storage via File Transfer Protocol (FTP) or some other protocol or by copying though the use of a shared file system (block 606). The process software is then installed on the servers (block 608).

Next, a determination is made on whether the process software is be deployed by having users access the process software on a server or servers (query block 610). If the users are to access the process software on servers, then the server addresses that will store the process software are identified (block 612).

A determination is made if a proxy server is to be built (query block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 620). Another embodiment is to have the servers automatically copy the process software to each client and then run the installation program for the process software at each client computer. The user executes the program that installs the process software on his client computer (block 622) then exits the process (terminator block 624).

In query step 626, a determination is made whether the process software is to be deployed by sending the process software to users via e-mail. The set of users where the process software will be deployed are identified together with the addresses of the user client computers (block 628). The process software is sent via e-mail to each of the users' client computers (block 630). The users then receive the e-mail (block 632) and then detach the process software from the e-mail to a directory on their client computers (block 634). The user executes the program that installs the process software on his client computer (block 622) then exits the process (terminator block 624).

Lastly a determination is made on whether the process software will be sent directly to user directories on their client computers (query block 636). If so, the user directories are identified (block 638). The process software is transferred directly to the user's client computer directory (block 640). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 642). The user executes the program that installs the process software on his client computer (block 622) and then exits the process (terminator block 624).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 7A:
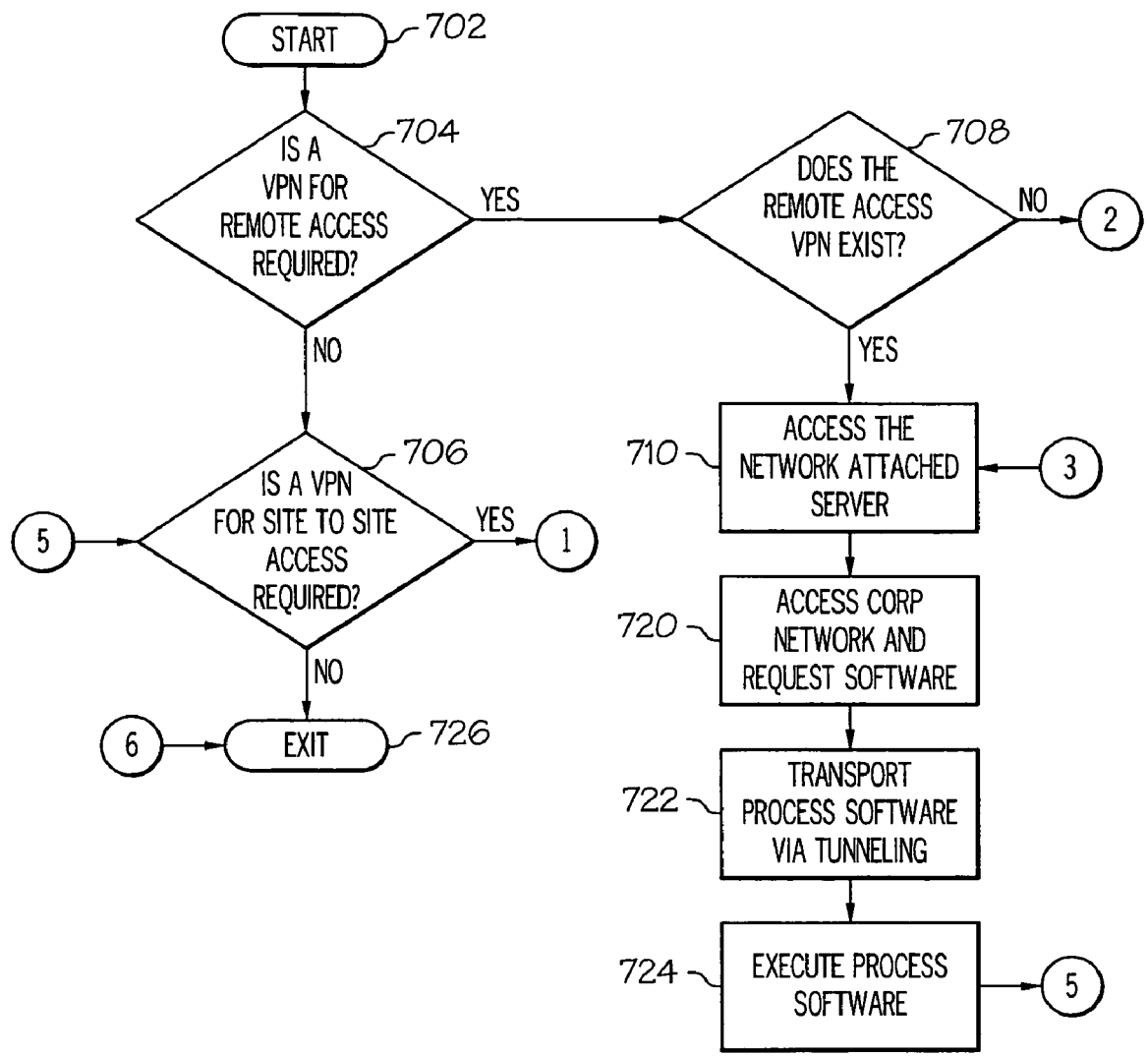
FIGS. 7A-C show a flowchart of steps taken to deploy in a Virtual Private Network (VPN) software that is capable of executing the steps shown and described in FIG. 5.
Figure 7B:
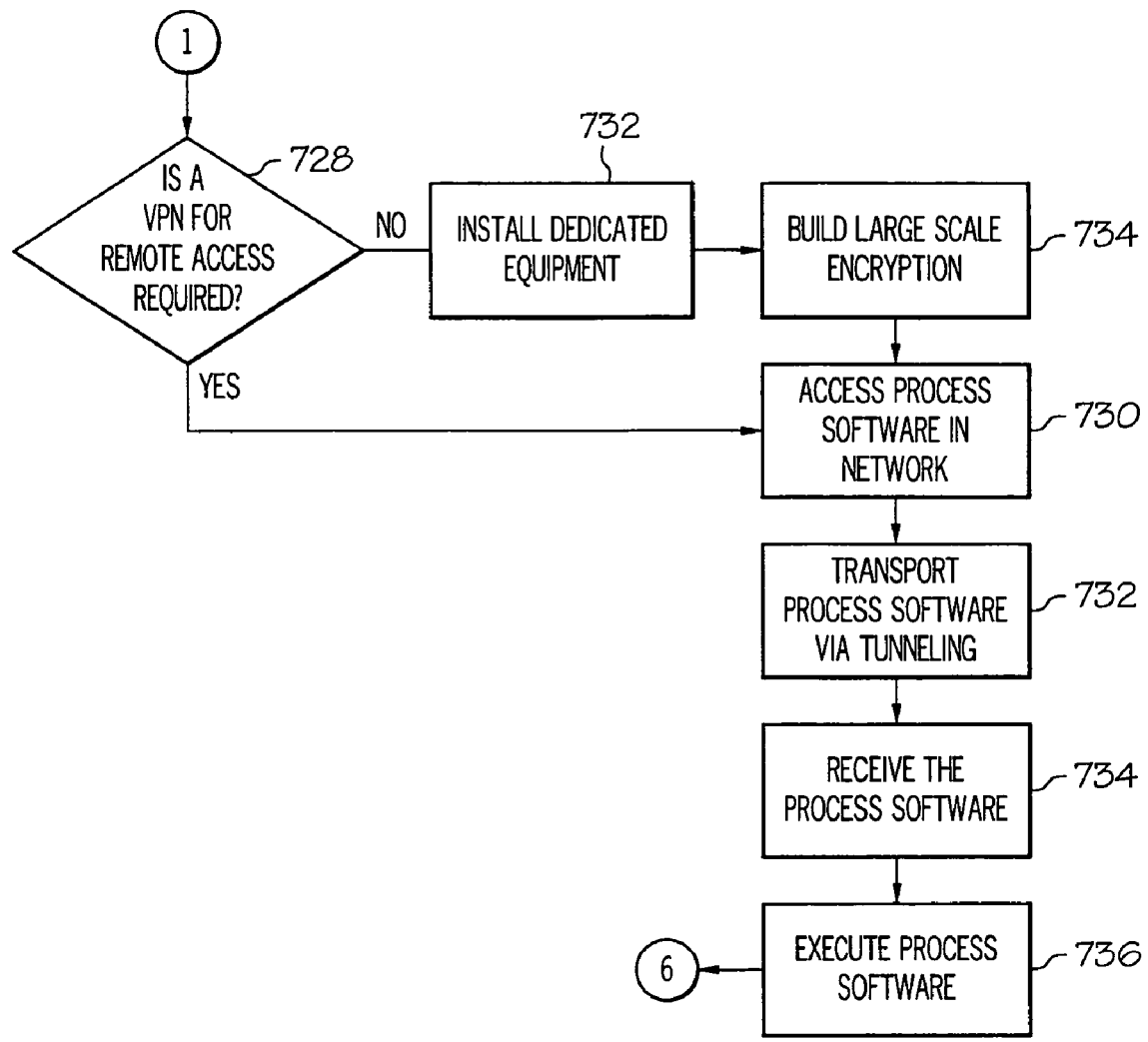
Figure 7C:
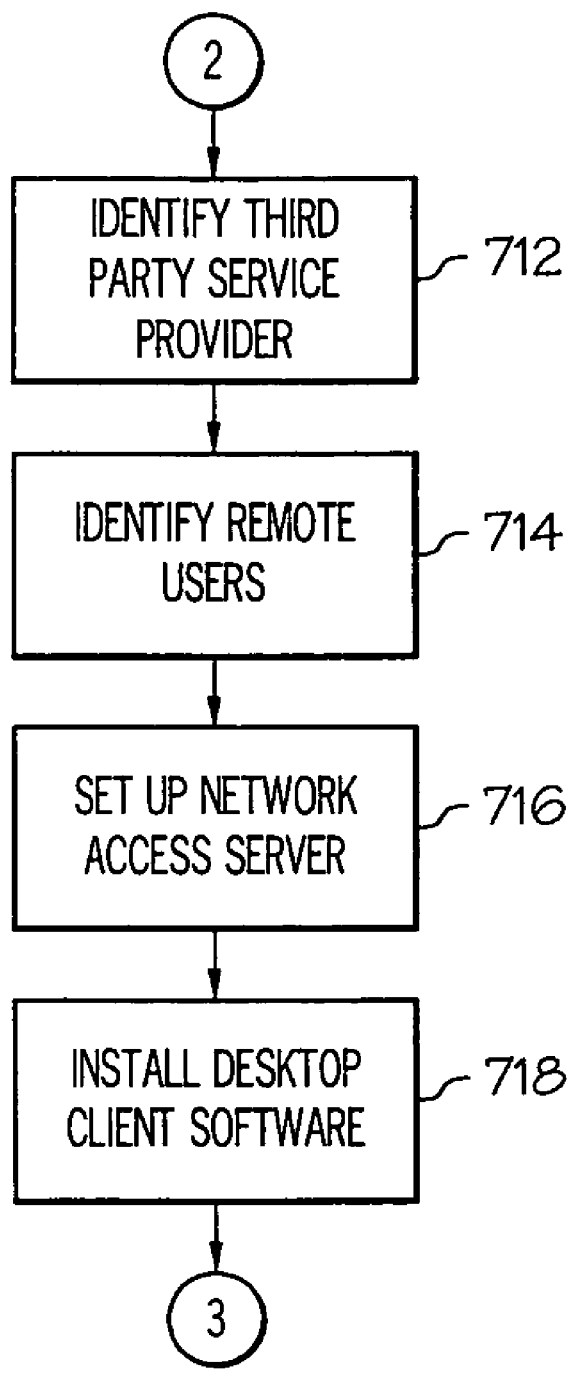

The process for such VPN deployment is described in FIG. 7. Initiator block 502 begins the Virtual Private Network (VPN) process. A determination is made to see if a VPN for remote access is required (query block 704). If it is not required, then proceed to (query block 706). If it is required, then determine if the remote access VPN exists (query block 708).

If a VPN does exist, then proceed to block 710. Otherwise identify a third party provider that will provide the secure, encrypted connections between the company's private network and the company's remote users (block 712). The company's remote users are identified (block 714). The third party provider then sets up a network access server (NAS) (block 716) that allows the remote users to dial a toll free number or attach directly via a broadband modem to access, download and install the desktop client software for the remote-access VPN (block 718).

After the remote access VPN has been built or if it has been previously installed, the remote users can access the process software by dialing into the NAS or attaching directly via a cable or DSL modem into the NAS (block 710). This allows entry into the corporate network where the process software is accessed (block 720). The process software is transported to the remote user's desktop over the network via tunneling. That is the process where software is divided into packets and each packet including the data and protocol is placed within another packet (block 722). When the process software arrives at the remote user's desk-top, it is removed from the packets, reconstituted and then is executed on the remote users desk-top (block 724).

A determination is then made to see if a VPN for site to site access is required (query block 706). If it is not required, then proceed to exit the process (terminator block 726). Otherwise, determine if the site to site VPN exists (query block 728). If it does exist, then proceed to block 730. Otherwise, install the dedicated equipment required to establish a site to site VPN (block 732). Then build the large scale encryption into the VPN (block 734).

After the site to site VPN has been built or if it had been previously established, the users access the process software via the VPN (block 730). The process software is transported to the site users over the network via tunneling (block 732). That is the process software is divided into packets and each packet including the data and protocol is placed within another packet (block 734). When the process software arrives at the remote user's desktop, it is removed from the packets, reconstituted and is executed on the site users desktop (block 736). The process then ends at terminator block 726.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 8A:
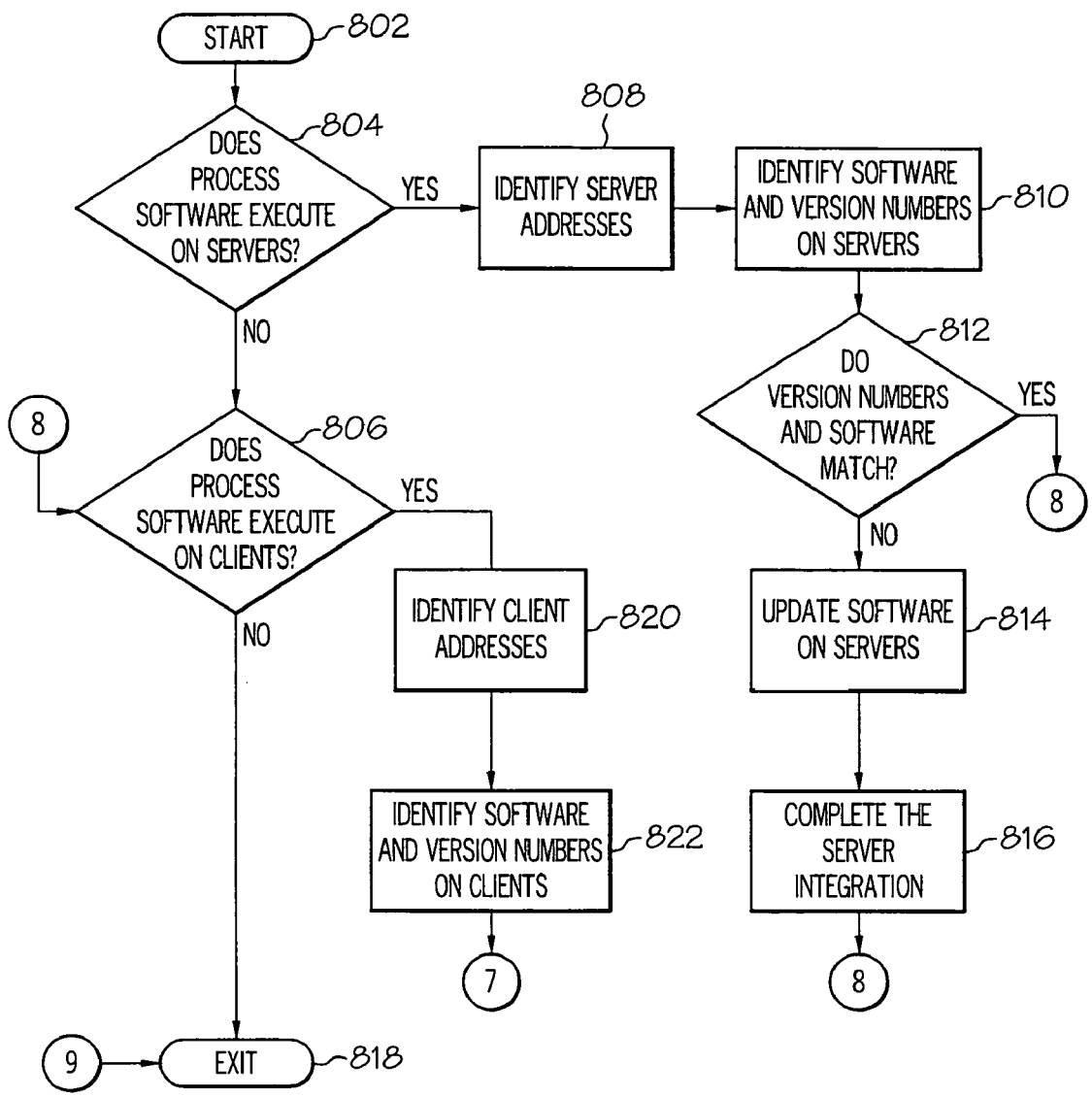
FIGS. 8A-B show a flowchart showing steps taken to integrate into a computer system software that is capable of executing the steps shown and described in FIG. 5.
Figure 8B:
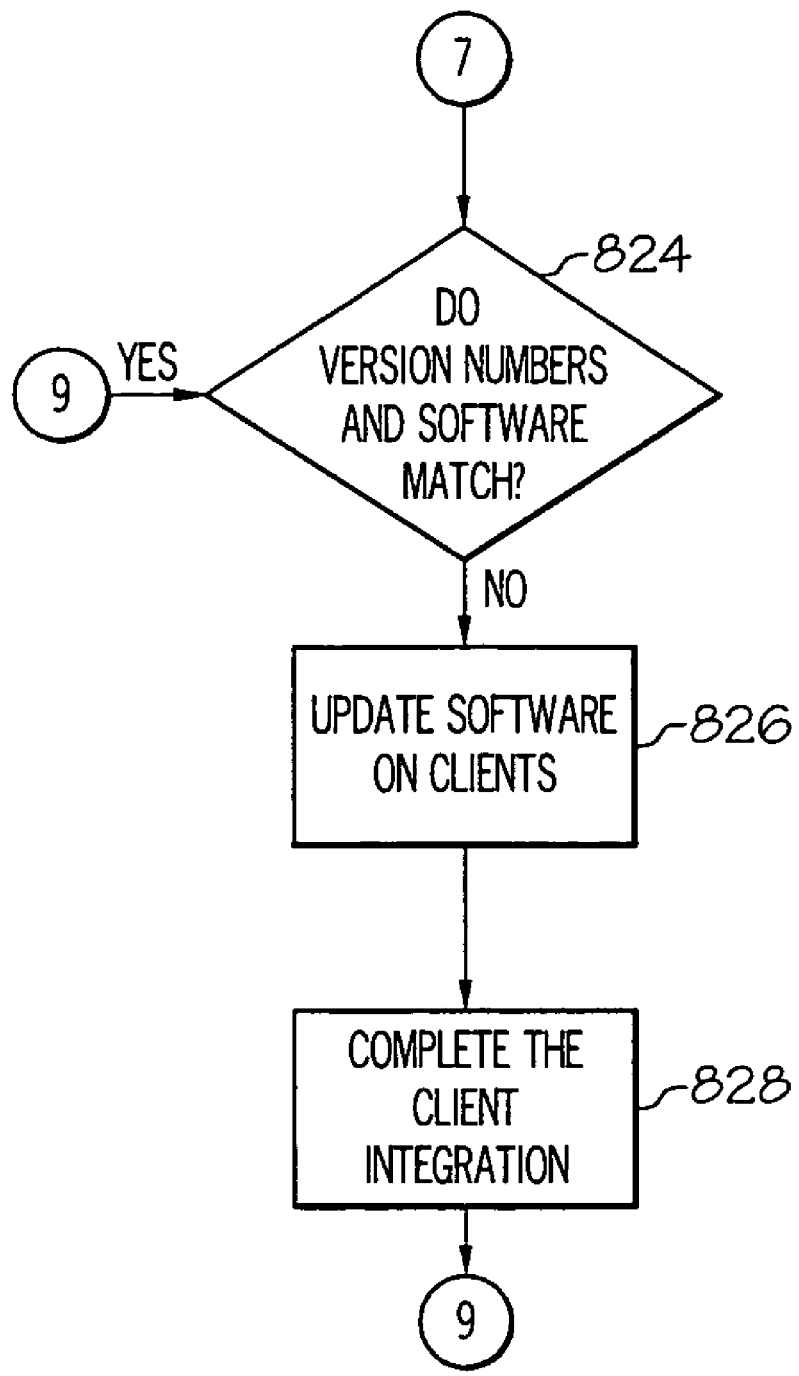

For a high-level description of this process, reference is now made to FIG. 8. Initiator block 802 begins the integration of the process software. The first tiling is to determine if there are any process software programs that will execute on a server or servers (block 804). If this is not the case, then integration proceeds to query block 806. If this is the case, then the server addresses are identified (block 808). The servers are checked to see if they contain software that includes the operating system (OS), applications, and network operating systems (NOS), together with their version numbers, which have been tested with the process software (block 810). The servers are also checked to determine if there is any missing software that is required by the process software in block 810.

A determination is made if the version numbers match the version numbers of OS, applications and NOS that have been tested with the process software (block 812). If all of the versions match and there is no missing required software the integration continues in query block 806.

If one or more of the version numbers do not match, then the unmatched versions are updated on the server or servers with the correct versions (block 814). Additionally, if there is missing required software, then it is updated on the server or servers in the step shown in block 814. The server integration is completed by installing the process software (block 816).

The step shown in query block 806, which follows either the steps shown in block 804, 812 or 816 determines if there are any programs of the process software that will execute on the clients. If no process software programs execute on the clients the integration proceeds to terminator block 818 and exits. If this is not the case, then the client addresses are identified as shown in block 820.

The clients are checked to see if they contain software that includes the operating system (OS), applications, and network operating systems (NOS), together with their version numbers, which have been tested with the process software (block 822). The clients are also checked to determine if there is any missing software that is required by the process software in the step described by block 822.

A determination is made is if the version numbers match the version numbers of OS, applications and NOS that have been tested with the process software (query block 824). If all of the versions match and there is no missing required software, then the integration proceeds to terminator block 818 and exits.

If one or more of the version numbers do not match, then the unmatched versions are updated on the clients with the correct versions (block 826). In addition, if there is missing required software then it is updated on the clients (also block 826). The client integration is completed by installing the process software on the clients (block 828). The integration proceeds to terminator block 818 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 9A:
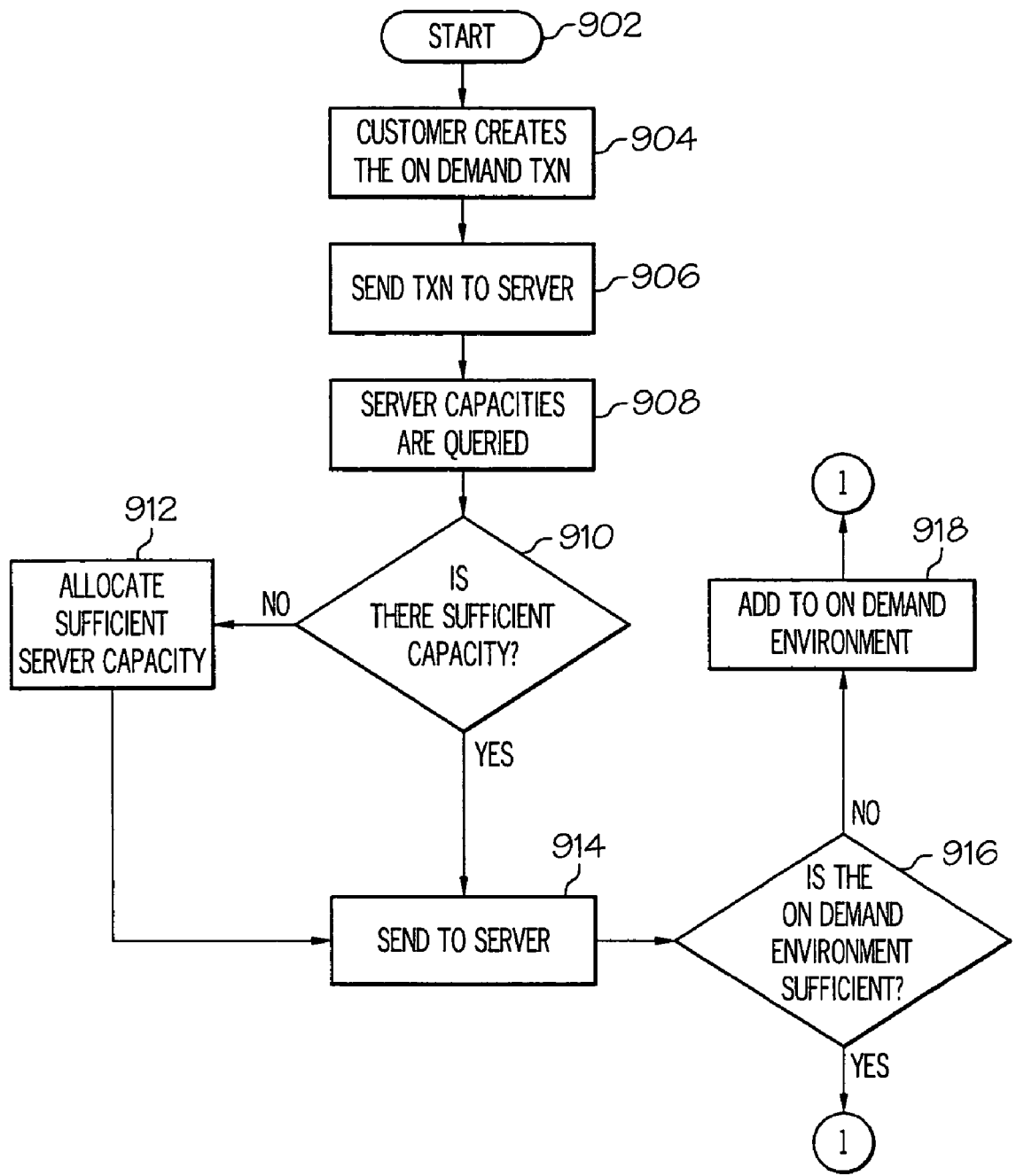
FIGS. 9A-B show a flowchart showing steps to execute the steps shown and described in FIG. 5 using an on-demand service provider.
Figure 9B:
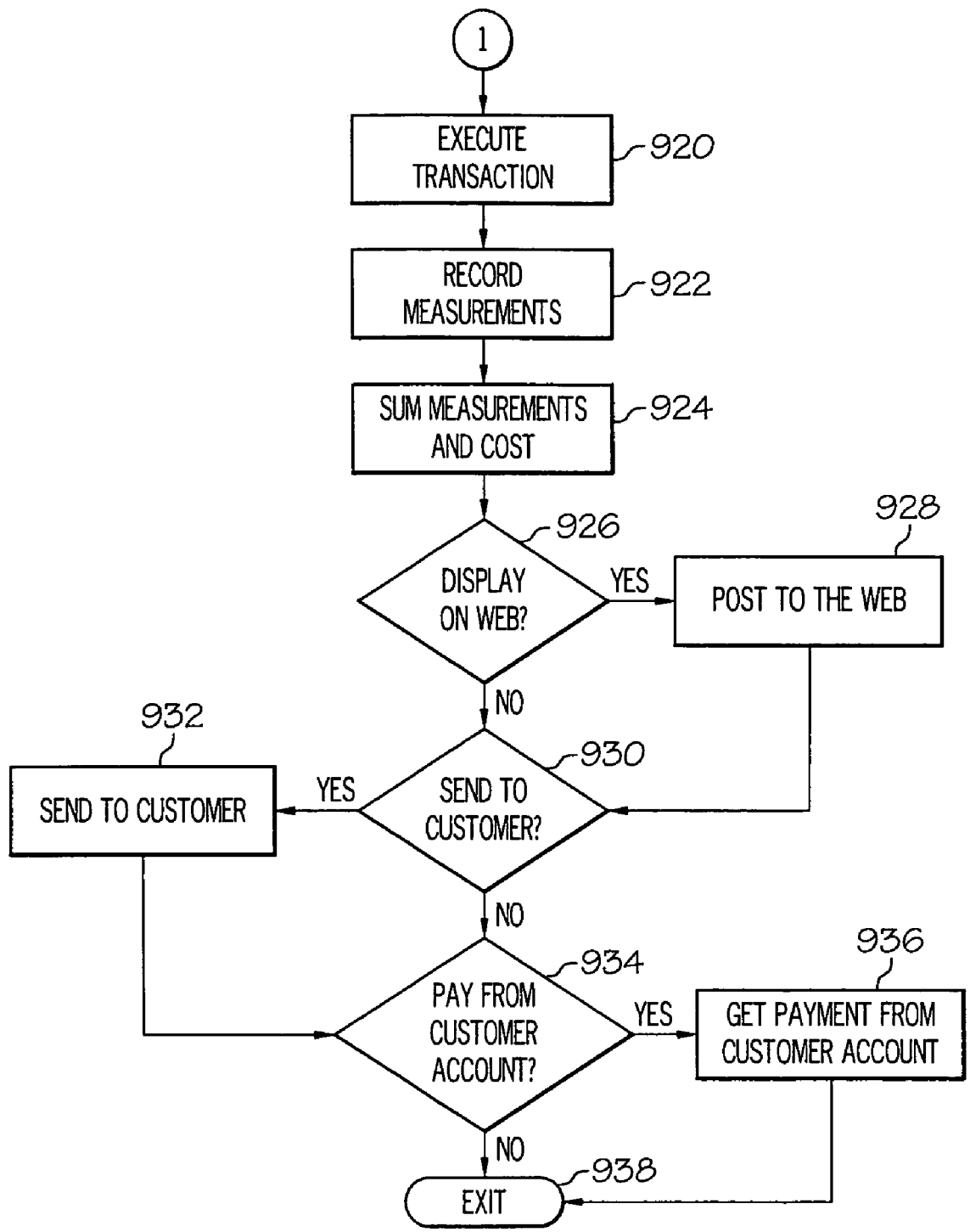

With reference now to FIG. 9, initiator block 902 begins the On Demand process. A transaction is created than contains the unique customer identification, the requested service type and any service parameters that further, specify the type of service (block 904). The transaction is then sent to the main server (block 906). In an On Demand environment the main server can initially be the only server, then as capacity is consumed other servers are added to the On Demand environment.

The server central processing unit-(CPU) capacities in the On Demand environment are queried (block 908). The CPU requirement of the transaction is estimated, then the servers available CPU capacity in the On Demand environment are compared to the transaction CPU requirement to see if there is sufficient CPU available capacity in any server to process the transaction (query block 910). If there is not sufficient server CPU available capacity, then additional server CPU capacity is allocated to process the transaction (block 912). If there was already sufficient available CPU capacity then the transaction is sent to a selected server (block 914).

Before executing the transaction, a check is made of the remaining On Demand environment to determine if the environment has sufficient available capacity for processing the transaction. This environment capacity consists of such things as but not limited to network bandwidth, processor memory, storage etc. (block 916). If there is not sufficient available capacity, then capacity will be added to the On Demand environment (block 918). Next the required software to process the transaction is accessed, loaded into memory, then the transaction is executed (block 920).

The usage measurements are recorded (block 922). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 924).

If the customer has requested that the On Demand costs be posted to a web site (query block 926), then they are posted (block 928). If the customer has requested that the On Demand costs be sent via e-mail to a customer address (query block 930), then these costs are sent to the customer (block 932). If the customer has requested that the On Demand costs be paid directly from a customer account (query block 934), then payment is received directly from the customer account (block 936). The On Demand process is then exited at terminator block 938.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

Also, it should be understood that at least some aspects of the present invention may be alternatively implemented in a computer-readable medium that stores a program product. Programs defining functions on the present invention can be delivered to a data storage systems or a computer system via a variety of signal-bearing media, which include, without limitation, non-writable storage media (e.g., CD-ROM), writable storage media (e.g., floppy diskette, hard disk drive, read/write CD-ROM, optical media), and communication media, such as computer, and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A method of organizing a plurality of information elements, said method comprising:
  providing, using a data processing system, a mapping framework implemented as a coupled plurality of nodes;
  attaching, using the data processing system, at least one information element among said plurality of information elements to at least one of said plurality of nodes;
  coupling, using the data processing system, at least two information elements among said plurality of information elements by a two-way hard relationship link, wherein said two-way hard relationship link includes two separate database links that are logically connected via a common identifier; and
  providing, using the data processing system, a viewer to present said information elements visually in at least one logical structure, wherein at least one of said information elements represents an image, video clip, or sound file, and wherein said data processing system includes at least one processor.

2. The method according to claim 1, further comprising:
  in response to said providing a viewer to present said information elements visually, selecting another logical structure to view said plurality of information elements.

3. The method according to claim 1, further comprising:
  in response to said providing a viewer to present said information elements visually, adding at least one additional two-way hard relationship link between said plurality of information elements.

4. The method according to claim 1, further comprising:
  in response to said providing a viewer to present said information elements visually, deleting said at least one two-way hard relationship link.

5. The method according to claim 1, wherein said at least one logical structure includes a tree structure.

6. The method according to claim 1, wherein said at least one logical structure includes a matrix.

7. The method according to claim 1, wherein said at least one logical structure includes a linear structure.

8. A system comprising:
  at least one processing unit;
  a data bus coupled to said at least one processing unit;
  a system memory coupled to said data bus; and
  a computer-usable medium embodying computer program code, said computer program code comprising instructions executable by said at least one processing unit and configured for:
    providing a mapping framework implemented as a coupled plurality of nodes;
    attaching at least one information element among a plurality of information elements to at least one of said plurality of nodes;
    coupling at least two information elements among said plurality of information elements by a two-way hard relationship link, wherein said two-way hard relationship link includes two separate database links that are logically connected via a common identifier; and
    providing a viewer to present said information elements visually in at least one logical structure, wherein at least one of said information elements represents an image, video clip, or sound file, and wherein said computer usable medium is a computer-usable storage medium.

9. The system according to claim 8, wherein said computer-usable medium further comprises instructions executable by said at least one processing unit and configured for:
  in response to said providing a viewer to present said information elements visually, selecting another logical structure to view said plurality of information elements.

10. The system according to claim 8, wherein said computer-usable medium further comprises instructions executable by said at least one processing unit and configured for:
  in response to said providing a viewer to present said information elements visually, adding at least one additional two-way hard relationship link between said plurality of information elements.

11. The system according to claim 8, wherein said computer-usable medium further comprises instructions executable by said at least one processing unit and configured for:
  in response to said providing a viewer to present said information elements visually, deleting said at least one two-way hard relationship link.

12. The system according to claim 8, wherein said at least one logical structure includes a tree structure.

13. The system according to claim 8, wherein said at least one logical structure includes a matrix.

14. The system according to claim 8, wherein said at least one logical structure includes a linear structure.

15. A non-transitory computer-usable medium embodying computer program code, said computer program code comprising computer executable instructions configured for:
  providing a mapping framework implemented as a coupled plurality of nodes;
  attaching at least one information element among a plurality of information elements to at least one of said plurality of nodes;
  coupling at least two information elements among said plurality of information elements by a two-way hard relationship link, wherein said two-way hard relationship link includes two separate database links that are logically connected via a common identifier; and
  providing a viewer to present said information elements visually in at least one logical structure, wherein said computer-usable medium is a computer-usable storage medium, and said computer executable instructions are processor executable instructions wherein at least one of said information elements represents an image, video clip, or sound file.

16. A non-transitory computer-usable medium according to claim 15, wherein said embodied computer program code further comprises computer executable instructions configured for:
  in response to said providing a viewer to present said information elements visually, selecting another logical structure to view said plurality of information elements.

17. A non-transitory computer-usable medium according to claim 15, wherein said embodied computer program code further comprises computer executable instructions configured for:
  in response to said providing a viewer to present said information elements visually, adding at least one additional two-way hard relationship link between said plurality of information elements.

18. A non-transitory computer-usable medium according to claim 15, wherein said embodied computer program code further comprises computer executable instructions configured for:

in response to said providing a viewer to present said information elements visually, deleting said at least one two-way hard relationship link.

19. A non-transitory computer-usable medium according to claim 15, wherein said at least one logical structure includes a tree structure.

20. A non-transitory computer-usable medium according to claim 15, wherein said at least one logical structure includes a matrix.

21. A non-transitory computer-usable medium according to claim 15, wherein said at least one logical structure includes a linear structure.

22. The computer-useable medium of claim 15, wherein the computer executable instructions are deployable to a client computer from a server at a remote location.

23. The computer-useable medium of claim 15, wherein the computer executable instructions are provided by a service provider to a customer on an on-demand basis.

* * * * *